United States Patent [19]
Kopf

[11] Patent Number: 6,017,451
[45] Date of Patent: *Jan. 25, 2000

[54] SPIDER FITTING FOR MULTI-MODULE FILTER SYSTEM, AND MOTIVE CART ASSEMBLY COMPRISING SAME

[76] Inventor: Henry B. Kopf, 108 Coatbridge Cir., Cary, N.C. 27511

[ * ] Notice: This patent issued on a continued prosecution application filed under 37 CFR 1.53(d), and is subject to the twenty year patent term provisions of 35 U.S.C. 154(a)(2).

[21] Appl. No.: 08/941,842

[22] Filed: Oct. 1, 1997

[51] Int. Cl.⁷ .................................................. B01D 29/88
[52] U.S. Cl. ..................... 210/232; 210/241; 210/323.2; 210/345
[58] Field of Search ............................... 210/241, 323.1, 210/323.2, 340, 345, 232, 322, 341; 285/125.1, 127.2, 130.1

[56] References Cited

U.S. PATENT DOCUMENTS

| | | | |
|---|---|---|---|
| 3,019,904 | 2/1962 | Stecher | 210/232 |
| 5,342,517 | 8/1994 | Kopf . | |
| 5,443,724 | 8/1995 | Williamson et al. | 210/323.2 |
| 5,611,924 | 3/1997 | Osborne | 210/323.2 |

FOREIGN PATENT DOCUMENTS

| | | | |
|---|---|---|---|
| 24011 | 3/1981 | Japan | 210/323.2 |
| 2233727 | 1/1991 | United Kingdom | 210/323.2 |

OTHER PUBLICATIONS

A/G Technology Corporation Brochure "Ultrafiltration –Microfiltration –Gas Separation".

Pall Corporation Brochure—Microza SP Series "Ultrafiltration Modules".

Pall Corporation Brochure "Ultrafiltration for the Pharmaceutical and Bioprocessing Industries".

*Primary Examiner*—Matthew O. Savage
*Attorney, Agent, or Firm*—Steven J. Hultquist; William A. Barrett

[57] ABSTRACT

A multi-arm spider fitting including a central hub from which such arms radiate. The arms are adapted at their extremities for coupling with filter modules, so that multiple filter modules can be secured to a single spider fitting, with the filter modules being arranged in a compact array to minimize the volumetric and spatial requirements of the filtration system. The multi-module filter assembly may be mounted on a motive cart, to provide for ready transport of the filter assembly between locations in a process plant.

11 Claims, 9 Drawing Sheets

SPIDER FITTING FOR MULTI-MODULE FILTER SYSTEM, AND MOTIVE CART ASSEMBLY COMPRISING SAME

BACKGROUND OF THE INVENTION

1. Field of the Invention

This invention relates to a spider fitting for a multi-module filtration system, utilizing for example elongate microfiltration or ultrafiltration modules in which a feed material is subjected to filtration to yield filtrate (permeate) and retenate streams. The invention also relates to a motive cart assembly comprising a multi-module filtration system utilizing such spider fittings, for enhanced ease and flexibility of filtration processing and filter system sterilization for use.

2. Background of the Invention

A wide variety of filtration systems are in use for pharmaceutical processing and a wide variety of other industrial manufacturing operations.

The filtration systems conventionally used in pharmaceutical, biological and bioprocessing applications involve membranes which are manufactured to yield highly discriminatory filtration of feed streams involving critical concentration and fractionation characteristics in the respective permeate and/or retenate streams.

A variety of filter modules have been employed in such systems and applications, including hollow fiber membranes which are utilized as a bundle of parallelly arranged hollow fibers bonded at their extremities to expose the open ends of the hollow fibers in the bundle. By such arrangement, a feed material is introduced to one end face of the filter module and flows longitudinally through the hollow fibers to the opposite face for discharge from the filter module. The species diffusing through the porosity of the hollow fiber membranes are expressed into the extra capillary space of the fiber bundle and are removed by permeate conduits. The permeate conduits are typically arranged in flow communication with the extra capillary space of the hollow fiber filter module, via an enclosing housing structure containing the hollow fiber module.

Such modules may be utilized at appropriate membrane pore sizes for microfiltration and ultrafiltration, and the fibers may be suitably designed to withstand high transmembrane pressures, to provide effective filtration over a wide range of process conditions.

Other tangential flow membrane filtration modules include spiral wound modules, such as those commercially available from AMT, Inc. (San Diego, Calif.), and Koch Membrane Systems, Wilmington, Mass., and ceramic filter modules such as those commercially available from Tech-Sep Division of Group Rhone Poulenc, Lyon, France.

The aforementioned hollow fiber, spiral wound, and ceramic filter modules are characteristically provided as elongate tubular-shaped filter elements.

In the deployment and use of such filter modules, a wide variety of manifolding and fixturing arrangements have been employed in the prior art. The filter modules may be arranged vertically (with respect to the longitudinal axis of the filter modules, for up-flow and/or down-flow operation, or such modules may be arranged horizontally, for corresponding horizontal flow of fluid to be separated, from the inlet to the outlet end of the filter module.

The prior art has utilized a multiplicity of such filter modules for the purpose of achieving greater efficiency, with the modules arranged in parallel, spaced-apart relationship to one another, with a feed manifold communicating with the feed ends of multiple filter modules, and with a discharge manifold communicating with the discharge ends of the filter modules.

By such parallel arrangements, with a linear manifold at the feed ends of the plural modules and a corresponding linear manifold at the opposite discharge ends of the plural modules, the overall filtration system is suitably utilized in a "flat" arrangement, whereby the modules stand or repose in a row arrangement.

Such multi-module filter systems of the prior art, despite their "flat" conformation, nonetheless require substantial volume of work space in the pharmaceutical or other process facility, and constitute stationary or permanent installations which are not susceptible of transport except with difficulty.

It therefore is an object of the present invention to provide a multi-module filter system of an improved character, relative to the flat conformation systems of the prior art.

It is another object of the present invention to provide a multi-module filter system of such type, which is spatially and volumetrically compact.

It is a further object of the invention to provide a multi-module filter system of the foregoing type, which is readily mobile in character, being easily transportable within a processing facility from one location to another, as for example from an active processing location to a cleaning or maintenance location.

Other objects and advantages of the present invention will be more fully apparent from the ensuing disclosure and appended claims.

SUMMARY OF THE INVENTION

In one aspect, the present invention relates to a multi-arm spider fitting which is usefully employed to interconnect corresponding ends of a number of filter modules, in a highly compact and hydrodynamically efficient manner.

In another aspect, the invention relates to a multi-module filter assembly having a spider fitting of the aforementioned type at both ends of the multiple modules, joined in closed flow communication with one of the respective ends of each filter module, to constitute a flow-through filtration assembly, for separating a feed stream into retentate, for discharge at an opposite end of the filter module, and permeate.

In a still further aspect, the present invention relates to a motive cart assembly, having mounted thereon a multi-module filter assembly comprising spider fittings as described above.

The spider fittings of the invention may be provided with any suitable number of arms to communicate in fluid flow communication with the ends of multiple filter modules. The number of arms of such spider fittings may be varied to accommodate a desired number of filter modules, with the spider fitting including at least three arms coupleable with ends of a corresponding number of filter modules, so that the filter modules are arranged in parallel aligned, circumferentially spaced-apart relationship to one another at ends of the filter modules, as hereinafter more fully described. The spider fitting therefore comprises at least three radially outwardly extended arms, each of which is formed for coupling with a single end of a filter module.

By the multi-module filter assembly of the invention, a multiplicity of filter modules can be accommodated within a significantly smaller volume than the multi-module filter systems of the prior art. As a result of such compactness, the multi-module filter systems of the invention may be mounted on a cart or other motive structure, for ready transport from one location to another in the process facility in which the filter modules are employed. By such mobility, the filter modules can be quickly and conveniently transported from an active processing site in the process facility to a sterilization or maintenance site at another location of the facility, thereby simplifying the overall layout and design of the process facility, and permitting the ancillary equipment associated with the filter modules to be likewise conveniently and compactly situated.

Other aspects, features and embodiments of the invention will be more fully apparent from the ensuing disclosure and appended claims.

DETAILED DESCRIPTION OF THE INVETION, AND PREFERRED EMBODIMENTS THEREOF

Figure 1:
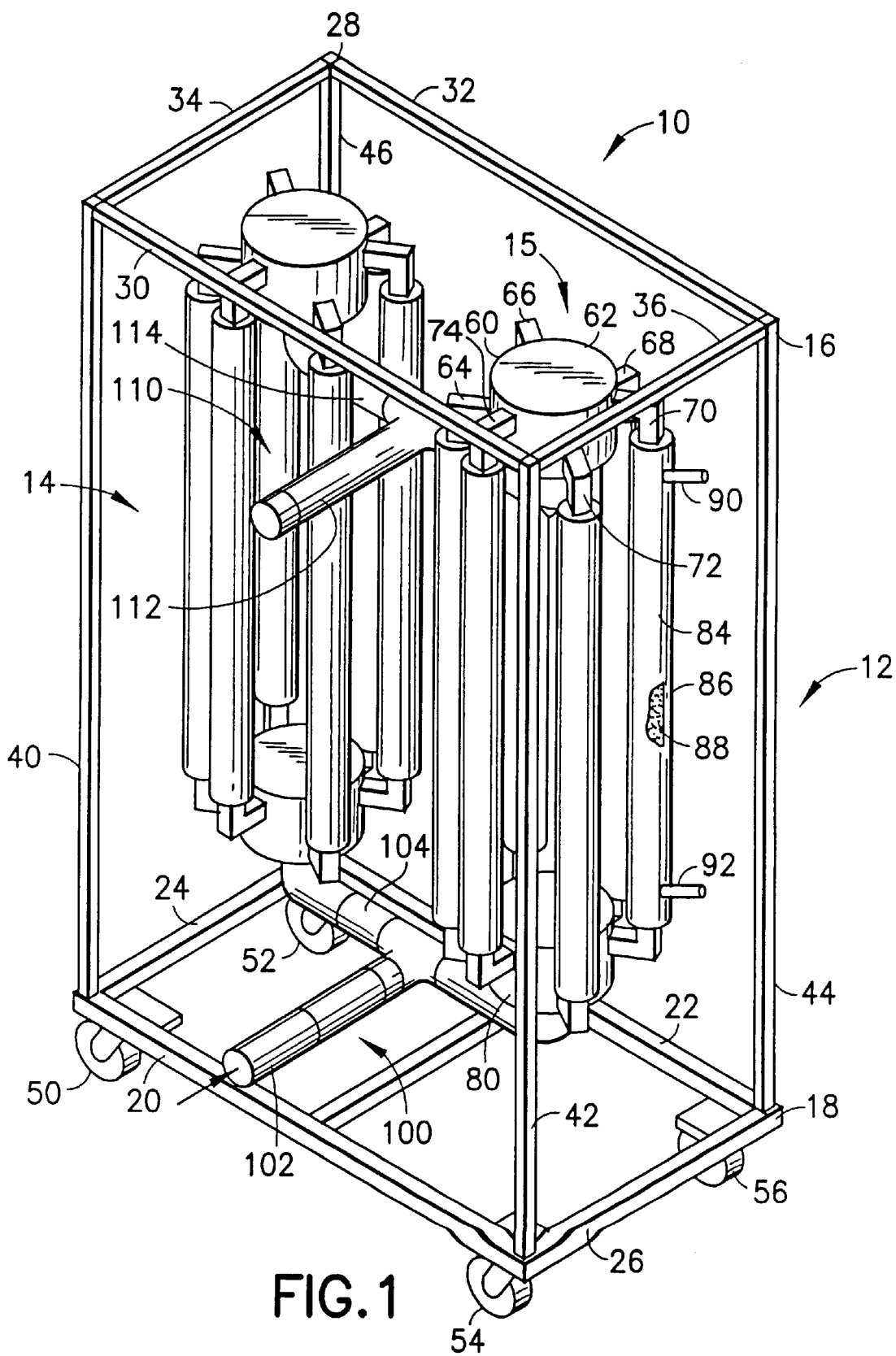
FIG. 1 is a perspective view of a motive cart according to one embodiment of the invention, having multiple spider fitting assemblies of filter modules mounted thereon, according to one embodiment of the invention.

Referring now to the drawings, FIG. 1 is a perspective view of a motive cart assembly 10, including a cart 12 and side-by-side arrays of multi-module filter assemblies 14 and 15, manifolded as hereafter described.

The cart 12 in the embodiment shown comprises a rectangular frame 16 including a rectangular base 18 formed by front beam 20, back beam 22 and side beams 24 and 26 joined at their extremities as shown to define the rectangular base portion. Correspondingly, the cart 12 comprises a top portion 28 formed by front beam 30, rear beam 32 and side beams 34 and 36, constructed similarly to the base portion. The base portion and top portion of the cart are interconnected by vertical upstanding beams 40, 42, 44 and 46, as illustrated.

The base portion 18 of the cart has rollers 50, 52, 54 and 56 mounted on the underside thereof, to provide motive transport capability to the cart. The rollers 50, 52, 54 and 56 may be of a swivel or caster type, to provide increased motive flexibility in use of the cart.

Mounted on the cart in side-by-side relationship to one another, are the multi-module filter assemblies 14 and 15. Each of these modules, as discussed hereafter in specific reference to assembly 15 (it being understood that assembly 14 is correspondingly constructed), includes an upper spider fitting 60 including a central hub body 62 to which are joined the radially outwardly extending connection arms 64, 66, 68, 70, 72 and 74, with the assembly correspondingly including a spider fitting 80 which is analogously constructed, and positioned in opposed facing relationship to the top spider fitting 60, so that the respective spider fittings are symmetrically arranged in such facing positions.

Each of the radially outwardly extending arms of the top spider 60 (the bottom spider fitting be analogously constructed) includes a radially outwardly extending segment joined at its outer radial extremity to a downwardly extending segment. The lower end of the downwardly extending segment of the arm is coupled in closed flow communication with a filter module 84. The filter module 84 includes a filter element housing 86 enclosing a filtration element 88, with the housing 86 having at its upper portion a permeate conduit 90, and a corresponding permeate conduit 92 at the lower portion of such filter element housing.

The spider fitting, as described hereinafter in greater detail, has a hollow interior volume in fluid flow communication with interior passages in the respective arms of the spider fitting.

At the lower ends of the multi-module assemblies 14 and 15, the hub bodies of the respective spider fittings are coupled in fluid flow communication with a feed manifold 100, comprising a main feed conduit 102 joined to a distribution conduit 104, so that the main feed conduit and the distribution conduit form together a "T" piping arrangement as shown. The extremities of the distribution conduit 104 are joined to the hub bodies of the respective spider fittings, so that material introduced in main feed conduit 102 is flowed through the distribution conduit 104 to each of the multi-module assemblies, flowing through the hub body of the respective lower spider fitting and through the interior volume of the hub body into the passages in the spider arms, from which the feed material to be filtered flows through the filter element 88 in the filter element housing 86. Retentate material is discharged from the filter housing at the upper end of the filter module 84, with the retentate material then flowing through the respective arms in the upper spider fitting to the interior volume in the hub body of each of the multi-module assemblies 14 and 15.

In the upper spider fittings, the interior volume communicates in fluid flow communication with a discharge manifold 110, which includes a main discharge conduit 112 joined to a collection conduit 114, so that the main discharge conduit 112 and collection conduit 114 form a "T" shaped piping element as shown. The extremities of the collection conduit 114 are coupled in closed flow communication with the interior volumes of the respective spider fittings, so that retentate material flows through such upper spider fittings into the collection conduit for discharge from the main discharge conduit 110.

The filter element housing 86 as shown is provided with the permeate discharge conduits 90 and 92, for discharge of permeate from the filter housing of the individual modules, for collection or other use, concurrent with the passage of the retentate from the filter element housing into the arm of the upper spider fitting.

It will be recognized that the permeate discharge and collection may be effected in various manners, other than using the conduits shown. Further, the filtration modules may be utilized for mass transfer operations other than filtration, with a mass transfer fluid being flowed into the filter element 88 from one of the conduits 90 and 92, and subsequently being discharged from the housing through the other of such conduits, to effect mass transfer with a material being flowed longitudinally through the filter element.

Thus, the apparatus shown may be for example utilized for introduction of nutrients into a biomass suspension flowed through the filter module, or for collection of secreted metabolites from biological material flowed through the filter module, or for other operations involving mass transfer, e.g., filtration, concentration, microbial culturing, carrying out enzymatic or other biochemical reactions, etc.

Figure 2:
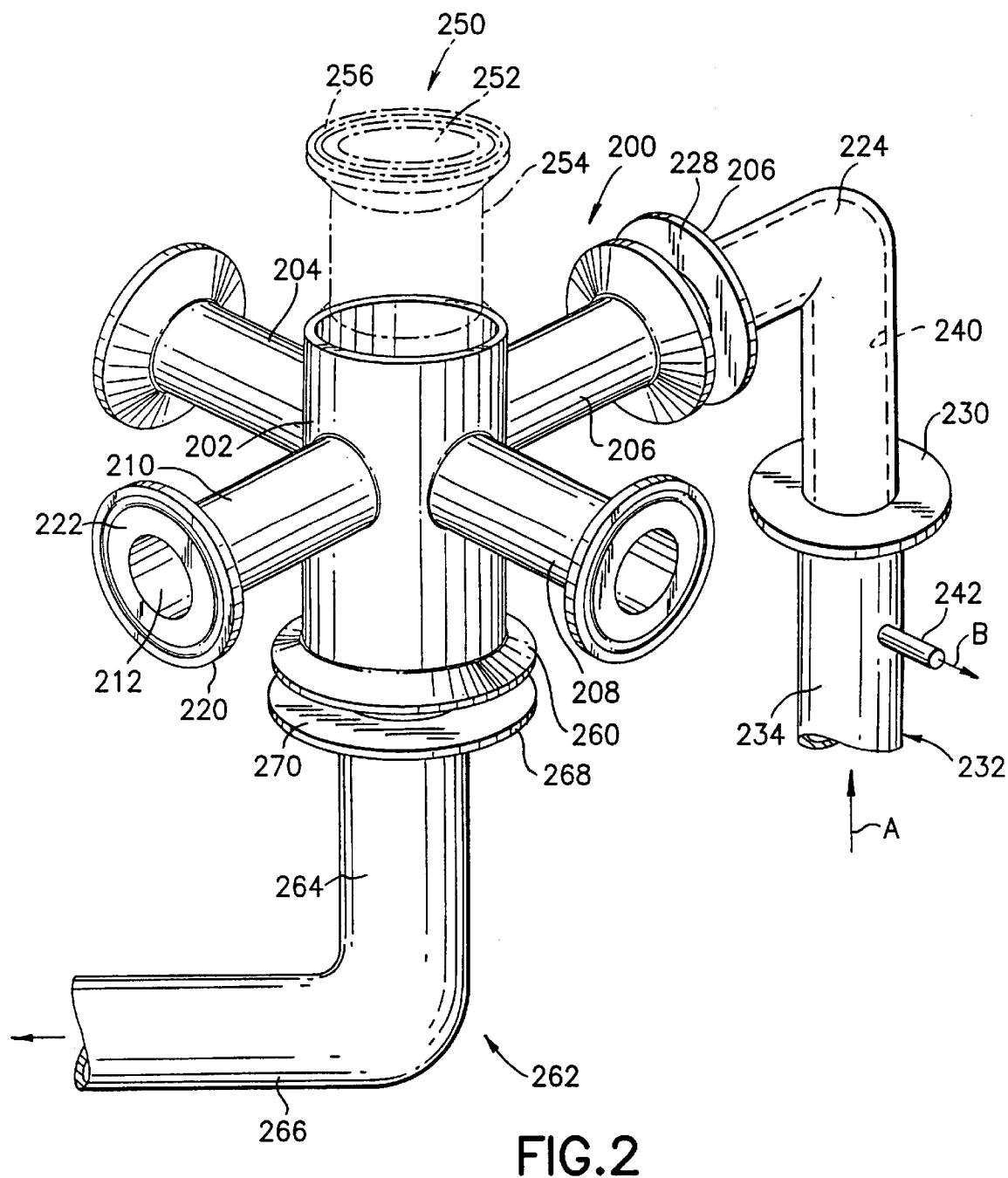
FIG. 2 is a perspective view of a 4-way spider fitting according to the present invention, in one embodiment thereof.

FIG. 2 is a perspective view of a so-called four-way spider fitting according to one embodiment of the present invention. As shown, the spider fitting 200 includes a main hub body 202, enclosing an interior volume as herein subsequently described, and with radially outwardly extending arms 204, 206, 208 and 210 secured to the hub body 202 so that the interior passages 212 of such arms are in closed flow communication with the interior volume within the hub body 202.

As illustrated, each of the arms at its outer radial extremity is joined to a coupling element 220 having a flat face 222, by means of which the coupling may be joined in mating engagement with the associated filter module, either directly or by means of an interposed fitting, such as right-angle elbow 224 having flange 226 with flat face 228 engaging the corresponding face of the coupling segment of arm 206. The coupling or flange of the arm may be secured to the flange 226 by means of conventional clamp or other fastening means, or may be secured in any other manner by welding, adhesive bonding, etc.

In this manner, the right-angle fitting 224 which is provided with a lower flange 230, may be in turn secured to the filter module 232, e.g., by interconnection of the housing 234 with the flange 230 by any of the aforementioned affixation means or securement techniques conventionally known in the art. The filter module 232 thus receives liquid which flows, in the embodiment shown, upwardly in the direction indicated by arrow A, with the retentate subsequently flowing into the interior passage 240 of the right-angle fitting 224, and with permeate being discharged from conduit 242 in the direction indicated by arrow B.

It will be recognized that in lieu of the radial arm segment terminating at an outer flange and being coupled to a right-angle fitting or other structure, the spider fitting may be formed as shown in FIG. 1, wherein the radially extending arms include a generally horizontal radially outwardly extending portion and a downwardly extending portion terminating at a lower end which is directly coupled to the filter module.

The spider fitting shown in FIG. 2 includes an upper section depicted in dashed line representation. This upper segment 250 includes a central bore opening 252 in the cylindrical body 254, joined to the hub body 202 of the fitting, with the cylindrical body terminating at its upper end in a generally flat flange which extends radially outwardly from the central bore opening 252. The central bore opening 252 communicates with the interior volume of the hub body 202 of the fitting, if such upper segment structure is employed.

Also shown in engagement relationship with the lower flange 260 of the spider fitting is a right-angle fitting 262 comprising a vertical upwardly extending portion 264 and a generally horizontal foot section 266. The vertically upwardly extending portion 264 teminates at its upper extremity in radial flange 268, whereby the flange 268 is engageable on the main flat face 270 thereof with the lower flange 260 of the spider fitting. The right-angle bend 262 may be part of a manifolding arrangement, or other piping layout, by means of which the spider fitting is joined in flow communication with ancillary process equipment.

FIG. 2 therefore shows an embodiment in which the hub body 202 may be joined to an upper segment 250 for coupling with other structure. The spider thus may be adapted for top connection, bottom connection, or top and bottom connection by means of the lower flange 260 and upper segment 250.

For example, in a given application, it may be desired to mate the lower flange 260 of the spider fitting with a solid closure plate, whereby fluid can only flow through the fitting through an upper segment 250.

It therefore will be seen that the spider fitting of the invention is extremely versatile in conformation and general structure.

Figure 3:
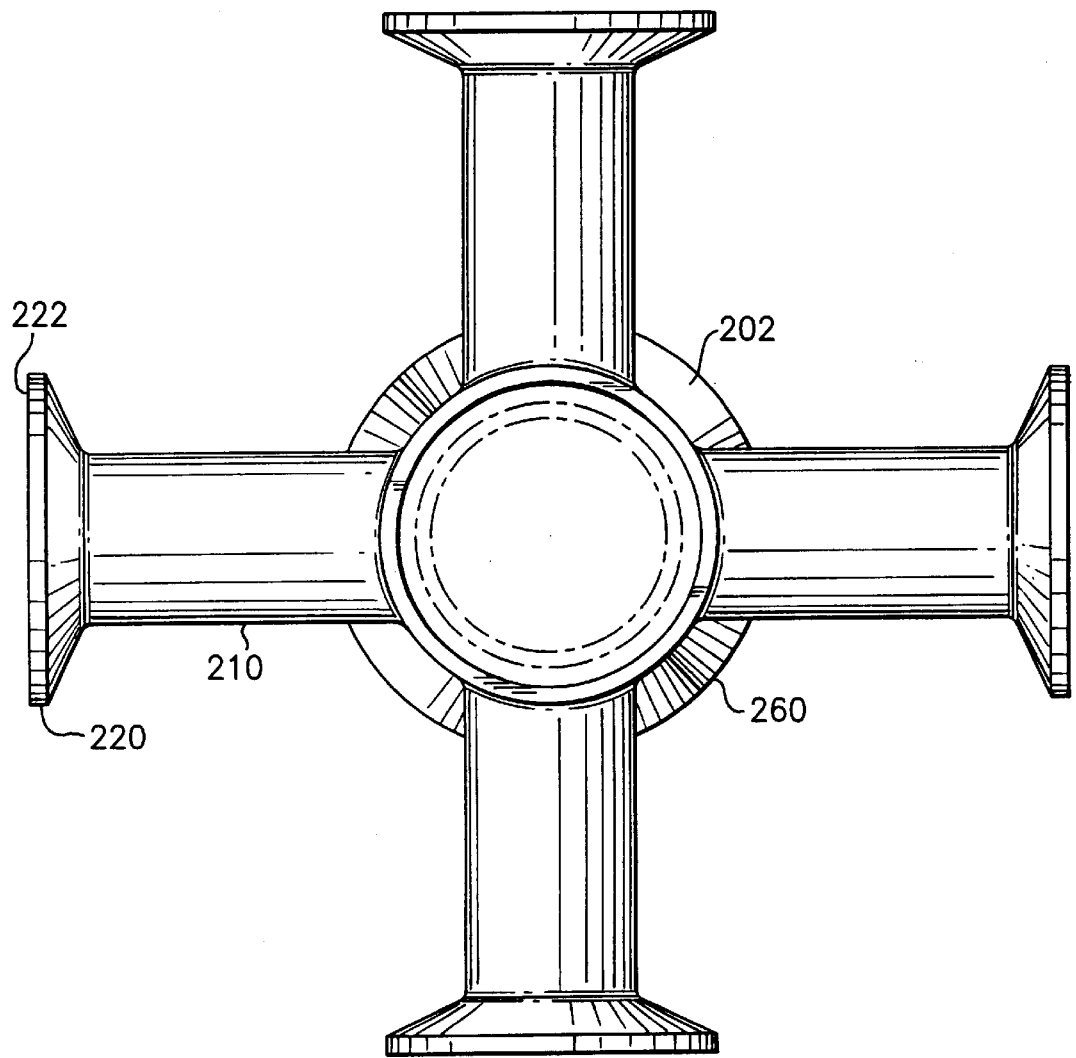
FIG. 3 is a top plan view of the spider fitting of FIG. 2.
Figure 4:
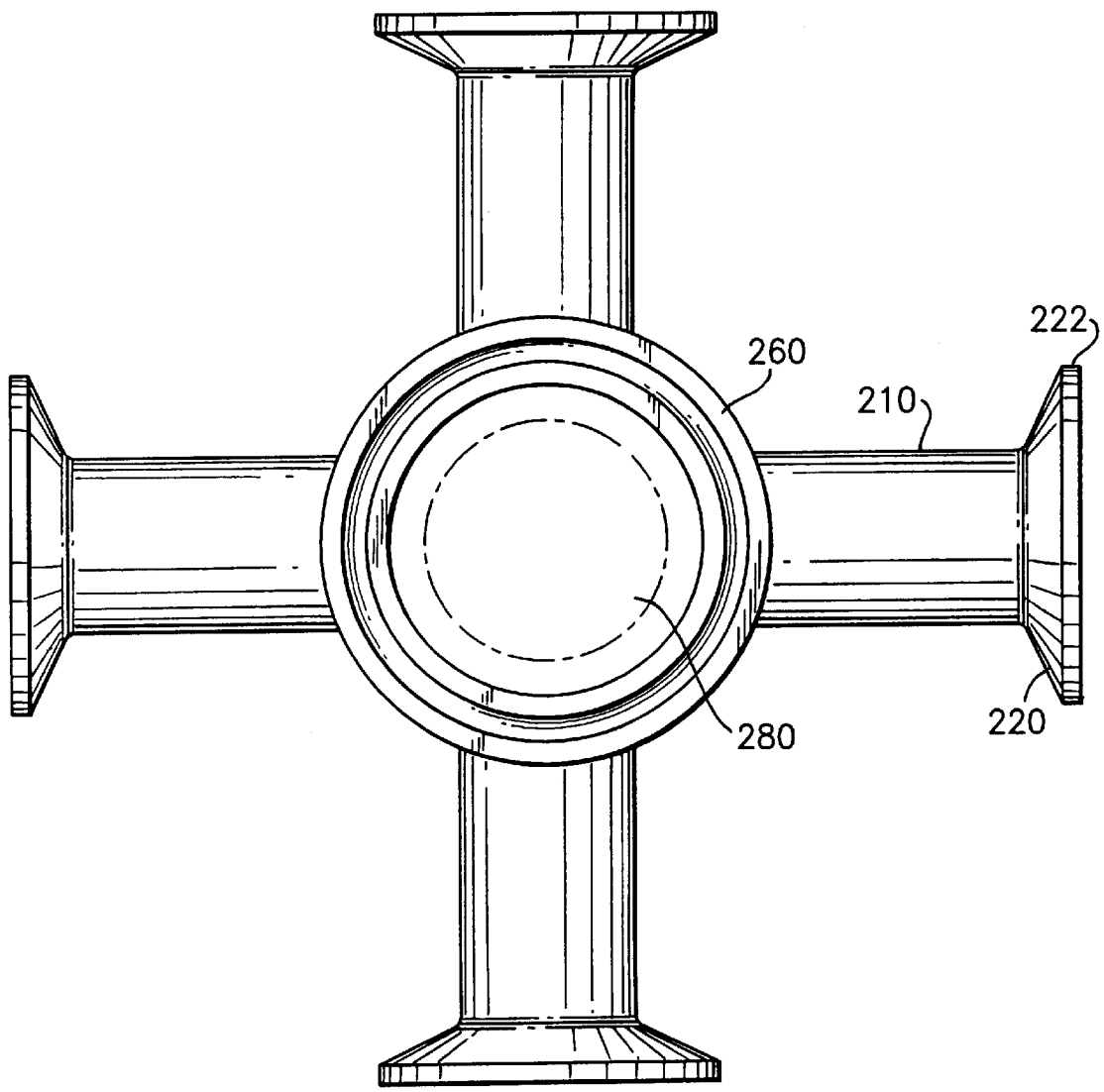
FIG. 4 is a bottom plan view of the spider fitting of FIGS. 2 and 3.
Figure 5:
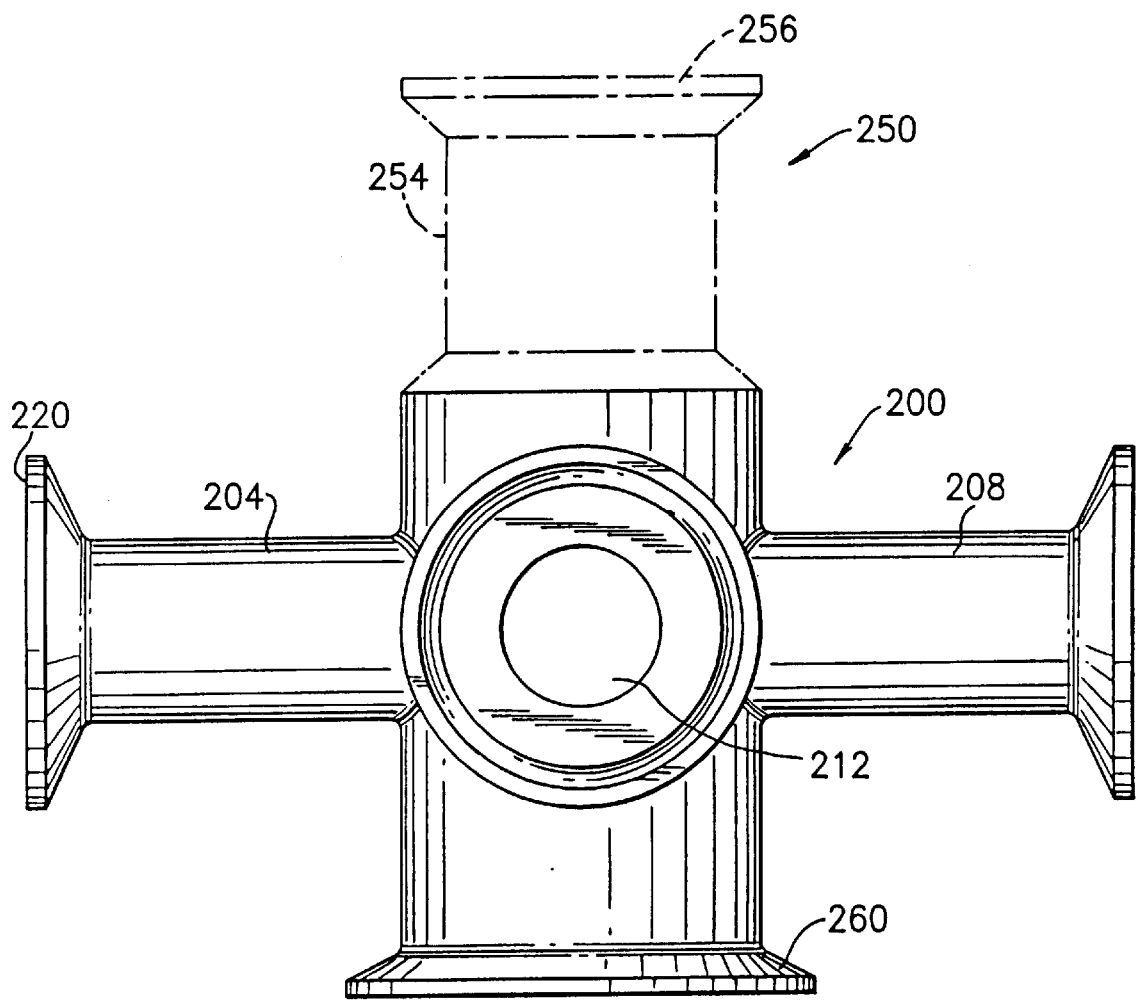
FIG. 5 is a front elevation view of the spider fitting of FIGS. 2–4.

FIG. 3 is a top plan view of the spider fitting of FIG. 2, FIG. 4 is a bottom plan view of the spider fitting of FIGS. 2 and 3, and FIG. 5 is a front elevation view of the spider fitting of FIGS. 2–4. In FIGS. 3–5, all structural features and elements are correspondingly numbered to FIG. 2. The outer flanges of the extremities of the respective arms may be of any suitable shape other than specifically shown, as may be useful for joining directly or indirectly to the filter modules associated with such spider fitting when the filtration system is fully assembled.

For example, in lieu of the specific flanges shown, the extremities of the arms of the spider fitting could be formed with a compression fitting structure, mechanical interlock structure, gasketed expansion-fit structure, or any other structural elements or features which facilitate coupling of the spider fitting directly or indirectly to the filter module, and which produce a suitably leak-tight joint.

FIG. 4 shows the interior volume 280 of the hub body of the spider fitting, and such volume communicates in fluid flow communication with the bore openings 212 in the respective arms.

The spider fitting shown in FIGS. 2–5 has four arms, each of which is circumferentially spaced apart by an arc length of 90 degrees from the next adjacent arm (see FIGS. 3 and 4).

The spider fitting of the present invention may be provided with any useful number of arms, e.g., three or more in number, each of which is associated with connection means for coupling to an individual filter element. In this manner, multiple filter modules can be accommodated within a very compact spatial region, and the spider fitting thereby achieves a substantial advance in the art over generally flat or planar arrangements of the filter modules.

Figure 6:
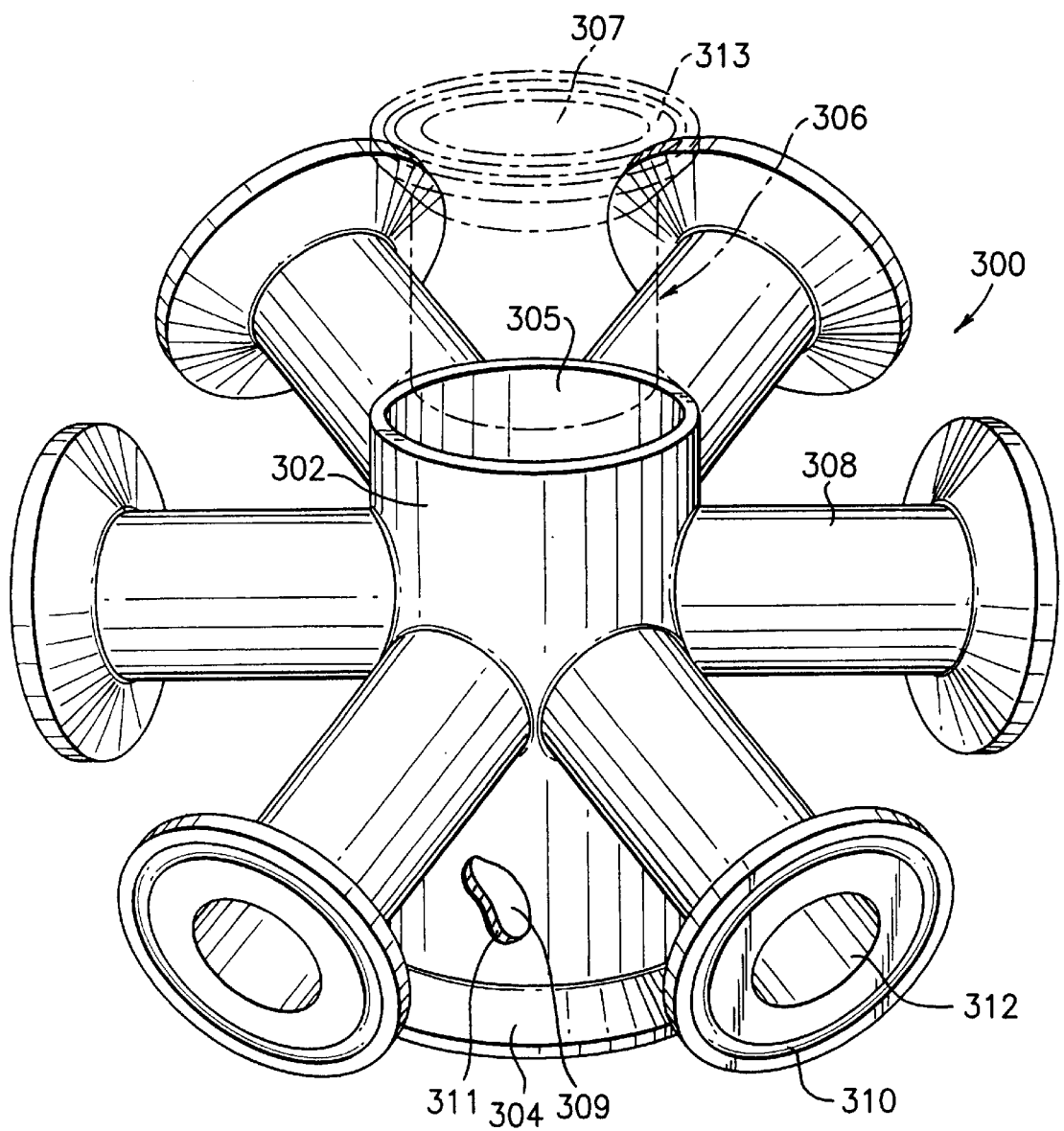
FIG. 6 is a perspective view of a 6-way spider fitting according to another embodiment of the invention.
Figure 7:
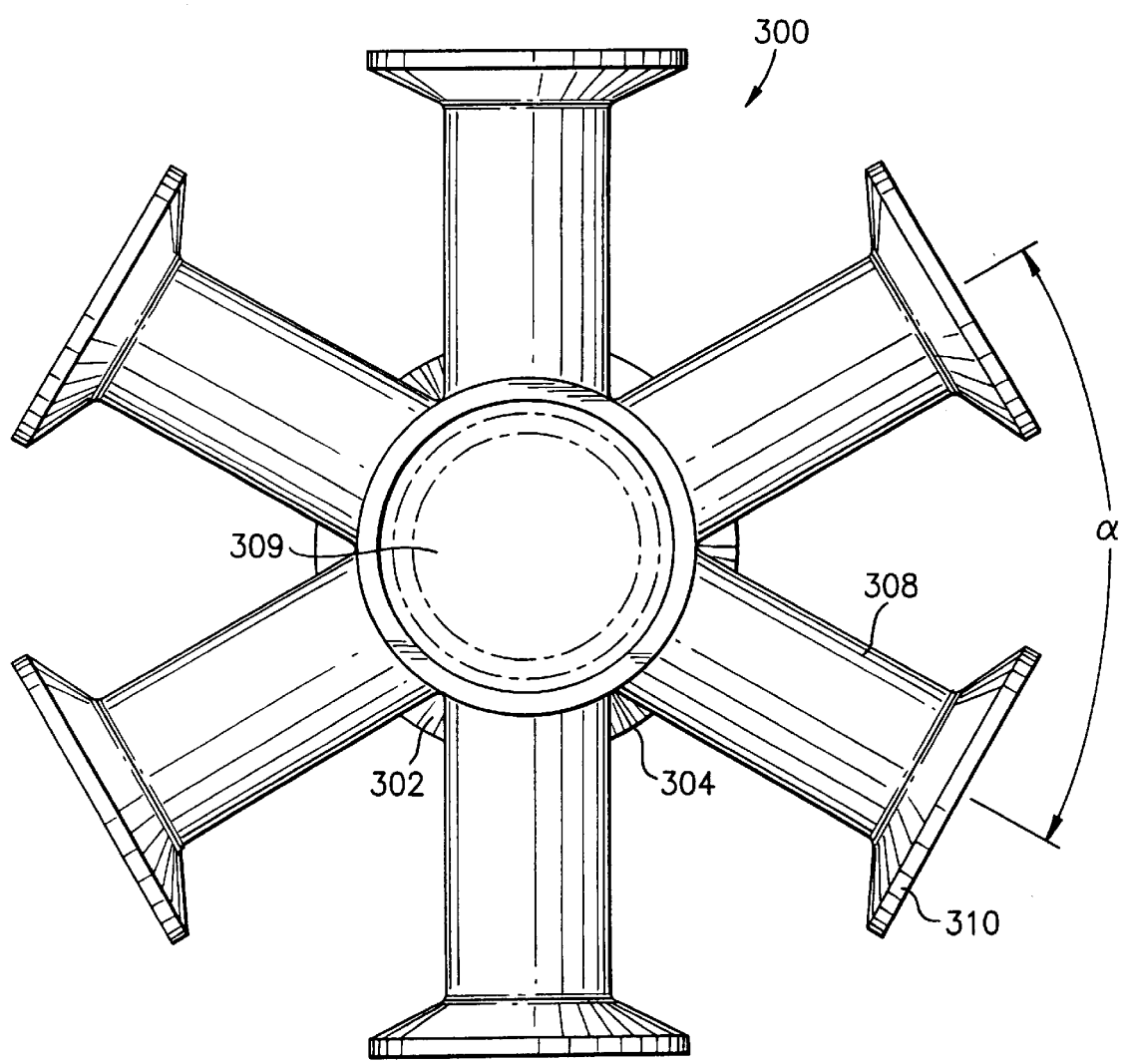
FIG. 7 is a top plan view of the spider fitting of FIG. 6.
Figure 8:
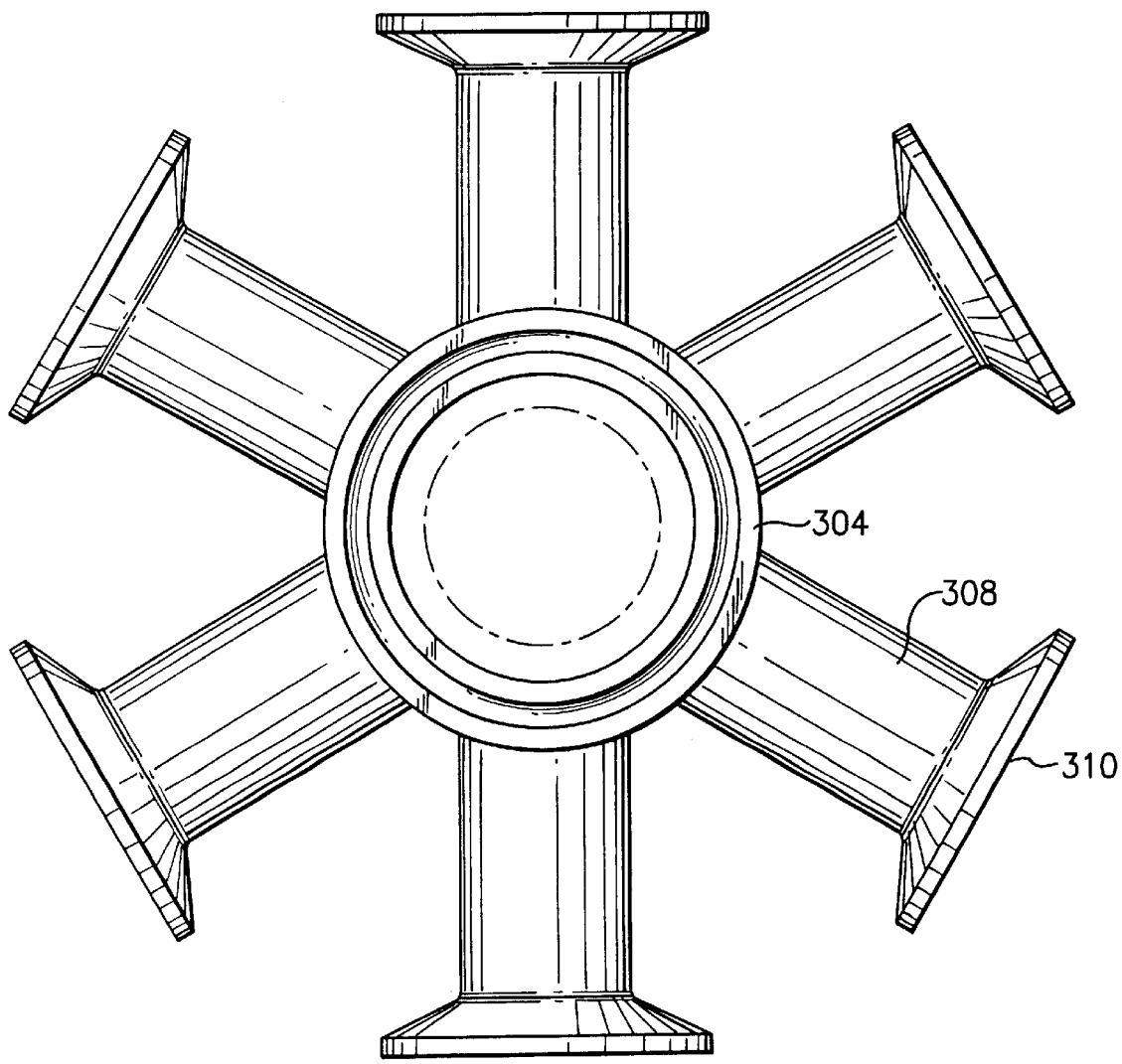
FIG. 8 is a bottom plan view of the spider fitting of FIGS. 6–7.
Figure 9:
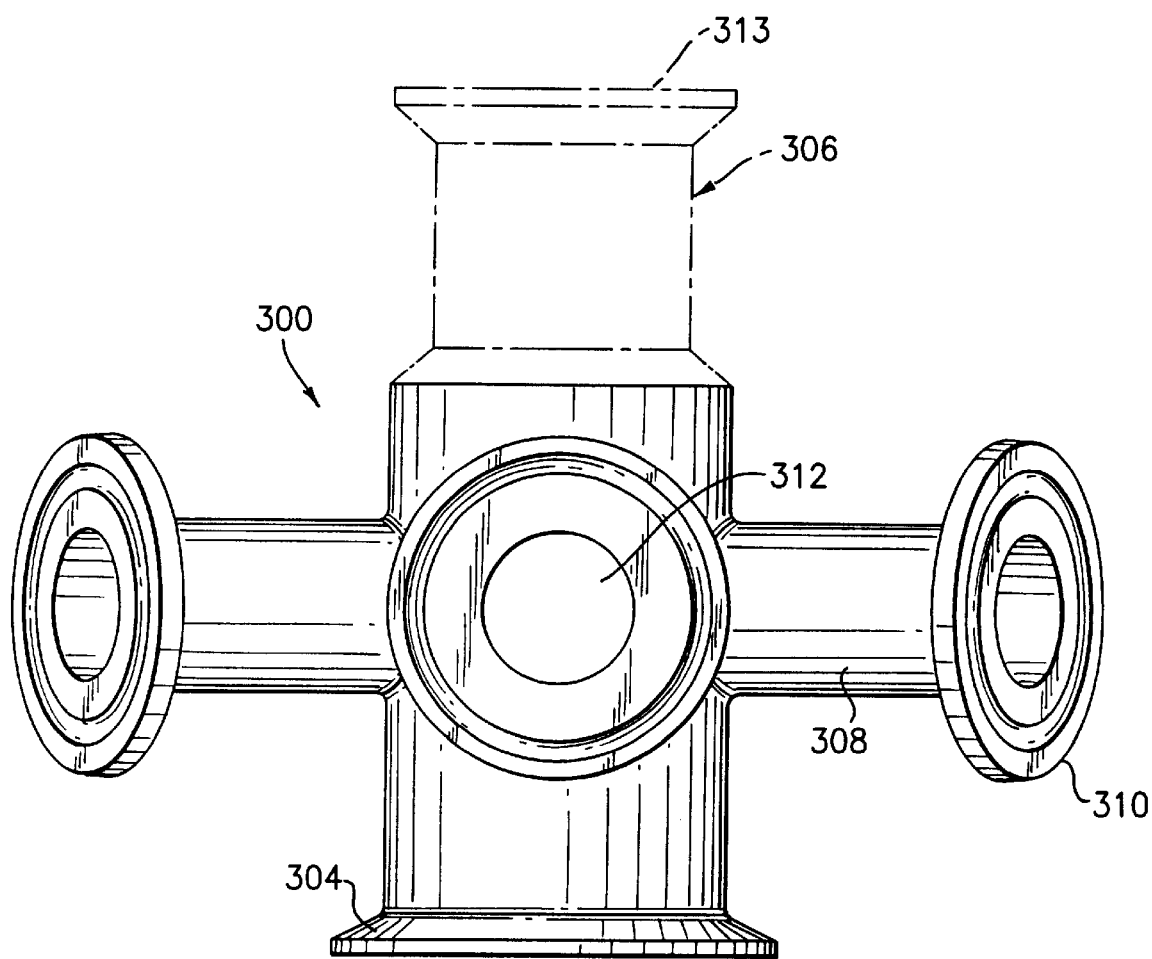
FIG. 9 is a front elevation view of the spider fitting of FIGS. 6–8.

FIG. 6 is a perspective view of a six-way spider fitting according to another embodiment of the invention, with FIG. 7 showing the fitting of FIG. 6 in top plan view, FIG. 8 in bottom plan view, and FIG. 9 in front elevation view.

Referring to FIGS. 6–9 in greater detail, the spider fitting 300 comprises a hub body 302 having a flange 304 at its lower extremity, for coupling with structure matably engageable therewith.

At its upper end, the hub body 302 may be provided with a solid cap surface 305, or alternatively, the hub body may comprise an upper segment 306 as shown having the central bore opening 307 therein communicating with the interior volume 309 bounded by the wall 311 of the hub body.

When present, the upper segment 306 may be provided with a radially outwardly extending, circumferentially continuous flange 313, for matable engagement with other structure, such as a manifold, piping or process equipment.

The hub body 302 has joined to the wall 311 radially outwardly extending arms 308 constituting flow conduits with central bores 312 therein communicating with the interior volume 309. The arms 308 have at their outer radial extremities, flanges 310 for matable engagement with filter modules or with connecting fittings associated with such filter modules. By such coupling, the bore opening 312 of arms 308 is interconnected with a multiplicity of filter modules, each respectively joined to a separate arm of the spider fitting.

As shown in FIG. 7, each of the arms 308 is spaced from adjacent arms by an arc distance α as shown in FIG. 7, of 60 degrees.

As mentioned, any suitable number of connection arms may be utilized in specific embodiments of spider fittings according to the present invention. By such accommodation of a multiplicity of discrete filter modules, the filter system is markedly reduced in size and volume.

The filter modules utilized in filter assemblies in accordance with the present invention may be of any suitable type, including hollow fiber modules such as those commercially available from A/G Technology, Inc. (Needham, Mass.) and Koch Membrane Systems (Wilmington, Mass.), spiral wound modules, such as those commercially available from AMT, Inc. (San Diego, Calif.) and Koch Membrane Systems (Wilmington, Mass.), and ceramic filter modules, such as those commercially available from Tech-sep, Group Rhone Poulenc (Lyon, France).

The spider fitting of the present invention is a substantial improvement over existing manifolded filter structures, for the following reasons.

First, the spider fitting effects a uniform distribution of flow to each filter module. Since each spider fitting employs a central feed and a central discharge arrangement, all filter modules are equidistant in relation to the central axis of the spider fitting, and the main volume interior to the central hub wall.

Second, the filter assembly comprising the spider fittings of the present invention is highly compact in character, requiring a minimum floor space in the process facility for manifolding of multiple filter modules, in relation to flat (linear) manifolded multi-module assemblies of the prior art. The filter modules are positioned on a radius line of a circle that is concentric with the central hub of the spider fitting. When positioned with the multiple filter modules circumferentially arrayed about the central axis of the spider hub, the circumferential distance between adjacent filter modules can be very small as opposed to linear manifold arrangements of corresponding filter modules. By way of example, a four-way spider fitting, of the type shown in FIGS. 2–5, with three-inch diameter filter modules can be accommodated within a circle (transverse to the longitudinal axis of the spider hub) with a circumference of 15 inches, as compared with a linear arrangement of corresponding filter modules, which would require a rectangle of 26 inches×5 inches area.

Third, the spider fittings and filter system comprising same entail a lower hold-up volume in relation to manifolded multi-module filter systems of the prior art. For example, the liquid hold-up volume in the interior space of the spider hub may be very small, e.g., less than 250 milliliters, whereby a total hold-up liquid volume in a filter assembly comprising upper and lower spider fittings would be on the order of 500 milliliters. By contrast, the hold-up liquid volume in a corresponding linear manifold would be 1145 milliliters in each of the upper and lower manifold structures, for a total hold-up liquid volume of 2290 milliliters. It is apparent that the hold-up liquid volume in the filter assembly of the present invention utilizing a spider fitting at each end of multiple filter modules, achieves a substantial reduction of the volume of liquid hold-up in the filtration system.

Fourth, a higher concentration factor is achievable utilizing filter assemblies including the spider fittings of the present invention, in applications in which the multi-module filter system is used for concentration of the feed material, as for example in dewatering of a flow stream to produce a desired product. The lower the final volume of product in such applications, the higher the final concentration factor for such product. As an example of the advantages achievable by the filter assembly of the invention utilizing spider fittings, a system of the present invention may be employed to concentrate 10 liters of feed material by dewatering to yield a residual retentate volume equal to 500 milliliters, representing the hold-up volume of the aforementioned spider fittings in which the liquid hold-up volume is 250 milliliters (2 spider fittings×250 milliliters hold-up volume per spider fitting=500 milliliters hold-up liquid yielding a concentration factor of 20.0). In contrast, a corresponding multi-module filter system utilizing linear manifolds is capable of concentrating 10 liters of feed material down to the 2290 milliliter hold-up volume of the two manifolds, yielding a concentration factor of 4.36. It therefore is apparent that the filter assembly of the present invention in such concentration applications achieves a marked advantage over the prior art linear manifolded filter systems.

Fifth, spider fittings are easier to clean than corresponding linear manifolds, since the spider fittings in relation to the linear manifolds have (i) less piping, (ii) lower volume, and (iii) smaller size.

Sixth, the spider fitting (see FIGS. 2 and 6) can also include an auxiliary port (upper segment shown in dashed line representation in FIGS. 2 and 6) with no significant increase in size or hold-up volume. Such auxiliary port can be used for (a) deployment of instruments such as a pressure gauge or pressure transducer, and (b) use of a vent valve for expelling air from the system at the "high point" of the system, or, conversely, for letting air ingress to drain the system.

Seventh, the spider fitting allows complete draining by virtue of its construction. By contrast, a linear manifold must be sloped 5 degrees to 6 degrees from the horizontal to facilitate substantially complete drainage. Sloping stainless steel piping is virtually impracticable due to the fact that standard flanged ends are not flexible and are welded at 90 degrees to the manifold pipe. Linear manifolds therefore must be custom made and installed appropriately in order to meet drainage requirements of sanitary piping designs. The spider fitting obviates such difficulties.

Eighth, the spider fitting is lower in cost of fabrication in relation to linear manifold structures. The hub body of the spider fitting is constructed from a length of piping with the required number of flanges welded around the outside of the pipe to enclose wall openings in the hub body, and with the position and the length of each arm and flange being geometrically readily determinable.

For example, the provision of three arms in the spider fitting involves spacing the arms at angles of 120 degrees around the periphery (cylindrical sidewall) of the hub. The provision of four spider arms requires a circumferential spacing distance between successive arms, of 90 degrees. The length of each arm measured from the center of the hub body of the spider fitting determines the distance between each filter module. In the case of four filter modules circumferentially spaced apart from each other at 90 degree intervals, the distance "C" between the centers of the successive filter modules, the distance "A" between the center of the spider fitting hub body and the first filter module, and the distance "B" between the center of the spider fitting hub body and the second filter module, may be formulaically expressed as:

$$C^2=A^2+B^2.$$

To provide uniform flow, A=B, so that $$C^2=2A^2.$$

As a specific example, for a spider fitting including four arms associated with four filter modules, in which the filter modules are 4 inches in diameter are positioned 1 inch apart in relation to one another, $$C^2A^2+B^2=1^2+2^2=5 \text{ inches}^2=2A^2$$

$A^2=2.5$ inches$^2$ $A=1.58$ inch.

The geometric and spatial arrangement of the filter modules in the filter assembly of the invention therefore is readily determined by simple calculation.

As is shown in FIG. 1, the spider fitting of the present invention, and the appertaining filter assembly comprising same, permits the filter assembly to be compactly arranged on a portable filter cart. Such arrangement permits the filter assembly to be moved on the cart from a use location in the process facility, to a maintenance or repair location, or simply to a storage location if the unit is taken out of use. It thus is possible to move the filter cart, without moving the pump station utilized in active filtration processing.

In addition, the spider fitting facilitates the construction and operation of a highly versatile filter cart system. Many filtration-based separation techniques require two or more filtration steps. Examples include the clarification of a cell culture with a microporous membrane, followed by a second filtration operation to concentrate a secreted protein by ultrafiltration. With two filter carts deploying multi-module filter assemblies, the carts can be utilized with a single pump station, thereby realizing economies in capital equipment costs, as well as operating costs, for the overall process facility. As a result, a process facility operator can carry out multiple process steps with a single pump station and multiple filter carts according to the invention. This realizes significant gains in the process facility, since the cost of a steam-in-place pump system utilized with filter modules may be on the order of $125,000 US, while the cost of a filter cart of the type shown in FIG. 1 is typically less than 10 percent of such cost. Thus, it is economic to deploy multiple filter carts which can be transported to the pump system in sequence, rather than deploying the multi-module filter system as a stationary unit in the process facility (which requires an associated pump system). Thus, the deployment of multiple filter carts in connection with the use of a single pump system in the process facility avoids the need for separate and costly fixed pump systems for pumping material through the filter assembly.

While the invention has been shown and described with reference to specific features and embodiments, it will be appreciated that the invention is not thus limited, but rather embraces numerous variations, modifications and other embodiments, in addition to those specifically described. Accordingly, the claims hereafter set forth are intended to be broadly construed and interpreted, in respect of the spirit and scope of the present invention.

What is claimed is:

1. A cross-flow multi-filter module assembly, comprising two spider fittings each in opposed facing relationship to one another, and including a central hub body having an interior volume, and having arms joined in fluid flow communication with the hub body interior volume, with each of the arms extending generally horizontally radially outwardly to a radially outer flanged terminus, and a right angle pipe fitting being coupled to each of the arms of the spider fitting, the right angle pipe fitting being flanged at respective ends thereof, with one of the flanged ends of said right angle pipe fitting being abuttingly engaged with the radially outer flanged terminus of an arm of the spider fitting so that the right angle pipe fitting extends generally horizontally radially outwardly from the said one of the flanged ends thereof and then generally vertically to the other of the flanged ends thereof, with said other of the flanged ends of the right angle pipe fitting being coupleable to an end portion of a filter module, and with respective filter modules arranged parallel to one another, each said filter module (1) including at least one permeate discharge for discharging permeate produced by filtration in said filter module, and (2) extending between said other of the flanged ends of a first right angle pipe fitting at a first end of the filter module said other of the flanged ends of a second right angle pipe fitting at a second end of the filter module wherein a lower end of each said hub body includes means for introducing or discharging a medium to or from the respective said interior volume, and wherein a distance from the interior volume of one of said spider fittings through the filter module to the interior volume of the other of said spider fittings is the same for each of the filter modules in said assembly, and wherein at least one of said spider fittings comprises an upper segment joined by a flange to the hub body, which upper segment includes a central bore opening which communicates with the interior volume of the hub body, and wherein the upper segment terminates at its upper end in a flange.

2. The cross-flow multi-filter module assembly of claim 1 wherein the hub body is cylindrical in shape.

3. The cross-flow multi-filter module assembly of claim 1 wherein the upper segment is cylindrical in shape.

4. The cross-flow multi-filter module assembly of claim 1 wherein each of the arms of the spider fittings is spaced from adjacent arms by less than 120 degrees.

5. The cross-flow multi-filter module assembly of claim 1 wherein each of the arms of the spider fittings is spaced from adjacent arms by 60 degrees.

6. The cross-flow multi-filter module assembly of claim 1 wherein each of the arms of the spider fittings is spaced from adjacent arms by 90 degrees.

7. The cross-flow multi-filter module assembly of claim 1 wherein the arms of the spider fittings are spaced apart from one another by a uniform distance.

8. A cross-flow multi-filter module assembly, comprising:
 (a) first and second spider fittings, each in an opposed facing relationship to the other, wherein:
  (i) each of said spider fittings comprises a central hub body having an interior volume;
  (ii) each of said spider fittings comprises arms joined in fluid flow communication with the hub body interior volume, with each of the arms extending generally horizontally radially outwardly to a radially outer flanged terminus;
  (iii) at least one of said spider fittings comprises an upper segment joined to the hub body and having a central bore opening which communicates with the interior volume of the hub body and terminating at its upper end in a flange, and (iv) a lower end of each said hub body includes means for introducing or discharging a medium to or from the respective interior volume;

(b) a right angle pipe fitting coupled to each of the arms of the first and second spider fittings, the right angle pipe fitting being flanged at respective ends thereof, with a first of the flanged ends being abuttingly engaged with the radially outer flanged terminus of an arm of the first spider fitting, so that the right angle pipe fitting extends generally horizontally radially outwardly from the said first of the flanged ends thereof and then generally vertically to a second of the flanged ends thereof, with the second of the flanged ends being coupleable to an end portion of a filter module;

(c) filter modules arranged parallel to one another, each said filter module:

(i) including at least one permeate discharge means for discharging permeate produced by filtration in said filter module;

(ii) extending between the second of the flanged ends of a right angle pipe fitting of the first spider fitting and a corresponding second of the flanged ends of a corresponding right angle pipe fitting of the second spider fitting; and wherein a distance from the interior volume of the first spider fitting through the filter module to the interior volume of the second spider fitting is the same for each of the filter modules in said assembly.

9. The cross-flow multi-filter module assembly of claim 8, wherein only one of said spider fittings comprises the upper segment of (a)(iii).

10. A cross-flow multi-filter module assembly, comprising:

(a) two spider fittings each in opposed facing relationship to one another, and including:

(i) each of said spider fittings comprises a central hub body having an interior volume;

(ii) each of said spider fittings comprises arms joined in fluid flow communication with the hub body interior volume, with each of the arms extending generally horizontally radially outwardly to a radially outer flanged terminus;

(iii) at least one of said spider fittings comprises an upper segment joined to the hub body and having a central bore opening which communicates with the interior volume of the hub body and terminating at its upper end in a flange, and (iv) a lower end of each said hub body includes means for introducing or discharging a medium to or from the respective interior volume;

(b) a right angle pipe fitting coupled to each of the arms of the first and second spider fittings, the right angle pipe fitting being flanged at respective ends thereof, with a first of the flanged ends being abuttingly engaged with the radially outer flanged terminus of an arm of the first spider fitting, so that the right angle pipe fitting extends generally horizontally radially outwardly from the said first of the flanged ends thereof and then generally vertically to a second of the flanged ends thereof, with the second of the flanged ends being coupleable to an end portion of a filter module;

(c) filter modules arranged parallel to one another, each said filter module:

(i) including at least one permeate discharge means for discharging permeate produced by filtration in said filter module;

(ii) extending between the second of the flanged ends of a right angle pipe fitting of the first spider fitting and a corresponding second of the flanged ends of a corresponding right angle pipe fitting of the second spider fitting.

11. The cross-flow multi-filter module assembly of claim 10, wherein only one of said spider fittings comprises the upper segment of (a)(iii).

* * * * *

UNITED STATES PATENT AND TRADEMARK OFFICE
CERTIFICATE OF CORRECTION

PATENT NO. : 6,017,451
DATED : January 25, 2000
INVENTOR(S) : Henry B. Kopf

Page 1 of 1

It is certified that error appears in the above-identified patent and that said Letters Patent is hereby corrected as shown below:

Column 3,
Line 39: change "INVETION" to -- INVENTION --.

Column 9,
Line 21: change "$C^2A^2 + B^2$" to -- $C^2=A^2 + B^2$ --.

Column 10,
Line 67: after "to" insert -- an upper end of --.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*